US012447074B2

(12) United States Patent
Brahic et al.

(10) Patent No.: US 12,447,074 B2
(45) Date of Patent: Oct. 21, 2025

(54) UNIVERSAL WHEELCHAIR SECUREMENT DEVICE FOR WHEELCHAIR ACCESSIBLE AUTONOMOUS VEHICLES

(71) Applicant: GM Cruise Holdings LLC, San Francisco, CA (US)

(72) Inventors: Francois William Brahic, San Francisco, CA (US); Vernon Lee Anderson, Sylmar, CA (US); Rajat Basu, Santa Clara, CA (US); Puneeth Doddagowdanakoppal Honnegowda, San Ramon, CA (US); Jordan Christopher Gatti, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 701 days.

(21) Appl. No.: 17/497,838

(22) Filed: Oct. 8, 2021

(65) Prior Publication Data
US 2023/0110338 A1  Apr. 13, 2023

(51) Int. Cl.
*A61G 3/08* (2006.01)
*B60W 60/00* (2020.01)

(52) U.S. Cl.
CPC ..... *A61G 3/0808* (2013.01); *B60W 60/00253* (2020.02)

(58) Field of Classification Search
CPC ........................ A61G 3/0808; B60W 60/00253
See application file for complete search history.

(56) References Cited

U.S. PATENT DOCUMENTS

| 4,601,620 A * | 7/1986 | Bugger ............... A61G 3/0808 |
| | | 296/65.04 |
| 8,029,062 B2 | 10/2011 | Appelqvist et al. |
| 8,936,295 B2 | 1/2015 | Slungare et al. |
| 9,415,703 B2 | 8/2016 | Slungare et al. |
| 10,336,216 B2 | 7/2019 | Slungare |
| 11,059,393 B2 | 7/2021 | Slungare |
| D929,074 S | 8/2021 | Vicker |
| 11,511,814 B2 | 11/2022 | Sandell et al. |
| 2008/0079252 A1 * | 4/2008 | Shutter ............... A61G 3/0808 |
| | | 280/755 |
| 2009/0121531 A1 | 5/2009 | Appelqvist et al. |

(Continued)

FOREIGN PATENT DOCUMENTS

DK  3081432 T3  1/2020
DK  3148838 T3  3/2021

(Continued)

*Primary Examiner* — Dino Kujundzic
(74) *Attorney, Agent, or Firm* — CANTOR COLBURN LLP

(57) ABSTRACT

A wheelchair securement system for a vehicle is provided, comprising: a first wheelchair restraint comprising a latch configured to grasp an axle of a wheelchair; a second wheelchair restraint comprising a mechanism to securely couple with an adapter on the wheelchair; and a controller configured to select from among one of three selections: a first mode of securing the wheelchair with the first wheelchair restraint alone; a second mode of securing the wheelchair with the second wheelchair restraint alone; and a third mode of securing the wheelchair using both the first wheelchair restraint and the second wheelchair restraint.

6 Claims, 13 Drawing Sheets

(56) References Cited

U.S. PATENT DOCUMENTS

| | | | |
|---|---|---|---|
| 2010/0086375 A1* | 4/2010 | Tremblay | A61G 3/0808 |
| | | | 410/7 |
| 2013/0113258 A1 | 5/2013 | Slungare et al. | |
| 2015/0164716 A1* | 6/2015 | Kilduff | A61G 3/0808 |
| | | | 410/7 |
| 2015/0165934 A1 | 6/2015 | Slungare et al. | |
| 2016/0016494 A1* | 1/2016 | Farooq | B60N 2/78 |
| | | | 297/411.21 |
| 2017/0120776 A1 | 5/2017 | Slungare | |
| 2018/0338875 A1* | 11/2018 | Cardona | B66F 7/243 |
| 2019/0366881 A1 | 12/2019 | Slungare | |
| 2020/0214913 A1* | 7/2020 | Pettigrew | A61G 3/0209 |
| 2020/0323713 A1 | 10/2020 | Girardin et al. | |
| 2021/0053528 A1* | 2/2021 | Sekizuka | B60R 21/01544 |
| 2021/0147004 A1 | 5/2021 | Sandell et al. | |
| 2021/0169714 A1* | 6/2021 | Goss | A61G 3/0808 |
| 2021/0275368 A1* | 9/2021 | Nagata | A61G 5/04 |
| 2021/0309127 A1 | 10/2021 | Slungare | |
| 2022/0144136 A1 | 5/2022 | Payne et al. | |

FOREIGN PATENT DOCUMENTS

| | | |
|---|---|---|
| EP | 3081432 B1 | 10/2019 |
| EP | 3148838 B1 | 3/2021 |
| EP | 3825179 A1 | 5/2021 |
| EP | 4001002 A1 | 5/2022 |
| EP | 3825179 B1 | 9/2022 |
| ES | 2873177 T3 | 3/2021 |
| FI | 3825179 T3 | 5/2021 |
| GB | 2574187 A | 12/2019 |
| GB | 2532561 B | 1/2021 |
| GB | 2600956 A | 6/2022 |
| PT | 3148838 T | 3/2021 |
| SE | 2051517 A1 | 6/2022 |

* cited by examiner

UNIVERSAL WHEELCHAIR SECUREMENT DEVICE FOR WHEELCHAIR ACCESSIBLE AUTONOMOUS VEHICLES

TECHNICAL FIELD OF THE DISCLOSURE

The present disclosure relates generally to wheelchair accessible autonomous vehicles and, more specifically, to an autonomous universal wheelchair securement device for wheelchair accessible autonomous vehicles.

BACKGROUND

Autonomous vehicles (AVs) can drive themselves using a variety of sensors and in-vehicle technologies. In such AVs, there is typically no human operator who drives or otherwise controls the vehicle. Such AVs may be used for a variety of purposes, including for autonomous delivery of items such as groceries and food to recipients, and for ride-sharing, for example, similar to a taxi service. Some AVs may be configured to be wheelchair accessible. Wheelchair accessible vehicles generally available in the marketplace are of two types: a first type allows for configuration of the vehicle to secure a particular wheelchair make and model; the second type allows for securement of a wide variety of wheelchairs but requires manual adjustment of the securement device according to the specific wheelchair make and model of a particular passenger. The first type is usually found in private vehicles; the second type is typically used in public vehicles, such as buses and ride-share vans.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
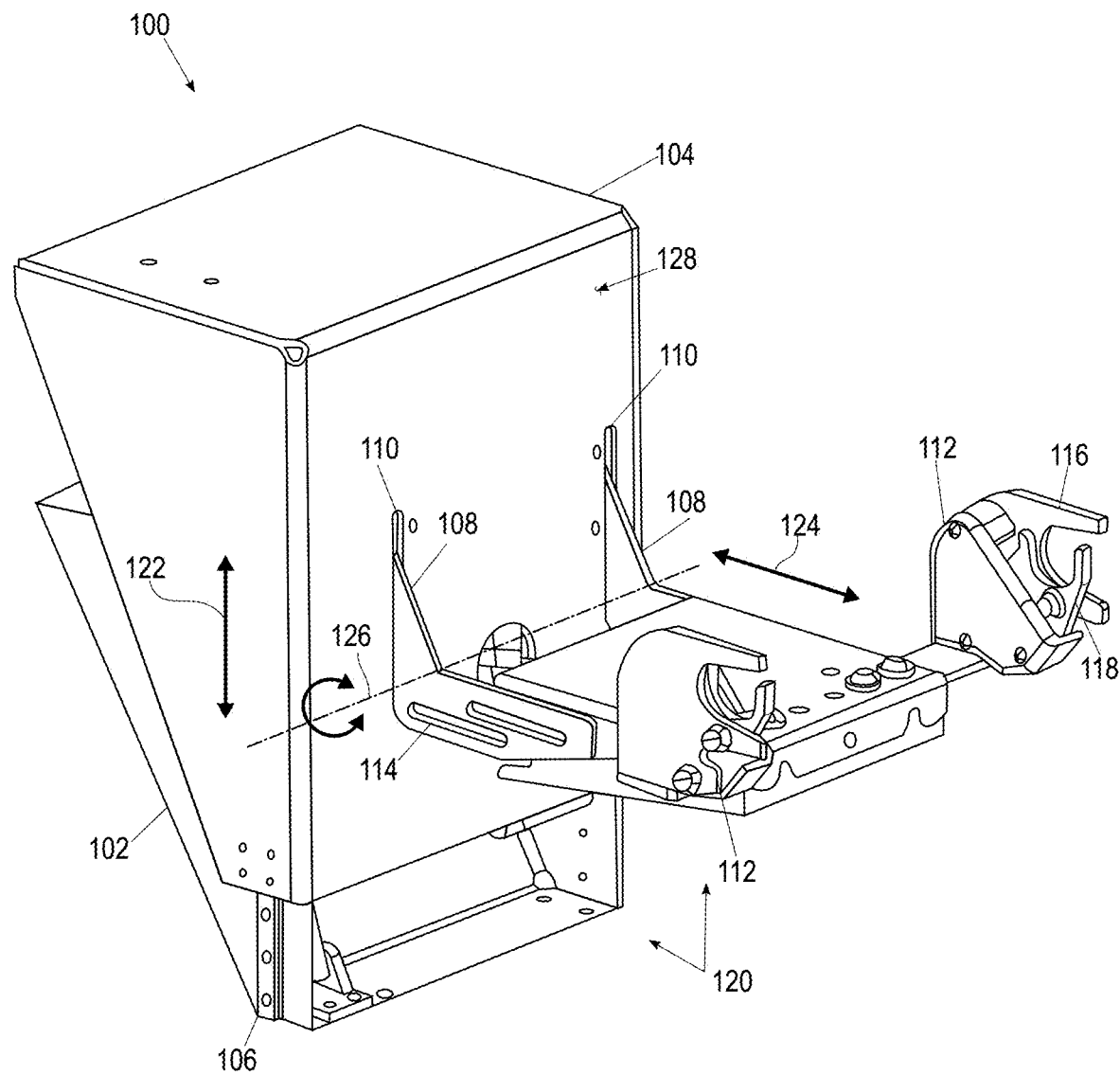
FIG. 1 illustrates an actuated unoccupied wheelchair restraint (AUWR) according to some embodiments of the present disclosure.

The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

When a passenger brings their wheelchair with them in an AV functioning as a ride-share vehicle, the wheelchair needs to be secured so that it cannot move around during transit or in the event of a crash. Wheelchair securement devices exist, but as mentioned previously, they are either fixed in their compatibility to a particular wheelchair make and model, or else require manual adjustment to secure a particular wheelchair. In an AV used for general ride-share in a manner similar to a public transport vehicle, neither of these approaches works well because of the wide variety of wheelchairs that potential passengers can bring to the rideshare AV, and the lack of a human operator in the vehicle to assist with securement or to adjust the securement system between riders.

As described herein, an AV is equipped with a securement system that comprises several elements. A first element comprises an AUWR having latches to capture the axle of rigid manual wheelchairs. Unlike a manual AUWR, the positions of the latches are not adjusted by hand using tools to match the dimensions of the wheelchair; instead, electrical actuators may control movement of the latches enabling them to automatically adjust positions to match any model and make of manual wheelchairs. A second element comprises an OWR that may allow an occupied wheelchair with a compatible adapter to dock into the OWR securely. A third element of the securement system comprises a transfer seat base (TSB) that may allow a wheelchair occupant to transfer to a seat adjusted and positioned appropriately alongside the secured wheelchair. A fourth element of the securement system comprises controllers with associated software and/or hardware to allow pre-configuration of the system for a particular wheelchair according to a passenger's specifications. Other elements are described further in reference to the corresponding figures as applicable.

Embodiments of the present disclosure provide a wheelchair securement system comprising: a first wheelchair restraint including a latch configured to grasp an axle of a wheelchair; a second wheelchair restraint including a mechanism to securely couple with an adapter on the wheelchair; and a controller configured to select from among one of three selections: a first mode of securing the wheelchair with the first wheelchair restraint alone; a second mode of securing the wheelchair with the second wheelchair restraint alone; and a third mode of securing the wheelchair using both the first wheelchair restraint and the second wheelchair restraint.

Embodiments further include a wheelchair restraint for a vehicle comprising: a bottom chassis securely fastened to a floor of the vehicle; a top chassis configured to slide up and down relative to the bottom chassis; an arm configured to rotate around a pivot axis at a first end proximate to the top chassis; a latch configured to securely grasp an axle of a wheelchair, the latch being attached to a second end of the arm distant from the top chassis and configured to slide relative to the arm toward and away from the top chassis; a first actuator configured to slide the top chassis relative to the bottom chassis; a second actuator configured to rotate the arm around the pivot axis; and a third actuator configured to slide the latch relative to the arm.

Embodiments further include a controller for a wheelchair securement system, the controller comprising: a memory configured to store preset configuration settings of a wheelchair; and a processor configured to generate a set of instructions for an actuator of a wheelchair restraint in an AV. The wheelchair restraint is configured to secure the wheelchair during motion of the AV.

As will be appreciated by one skilled in the art, aspects of the present disclosure, in particular aspects of wheelchair securement systems for AVs, described herein, may be embodied in various manners (e.g., as a method, a system, an AV, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Embodiments

FIG. 1 is a diagram illustrating an AUWR 100 according to some embodiments of the present disclosure. AUWR 100 comprises a bottom chassis 102 and a top chassis 104 configured to slide using a sliding mechanism 106. In the embodiment shown, sliding mechanism 106 comprises rails affixed to bottom chassis 102 and a mating member (not shown) affixed to top chassis 104 that permits sliding along the rails. In some embodiments, sliding mechanism 106 may comprise pins and slots, for example, with the slots provided in top chassis 104 and pins in bottom chassis 102 or vice versa, the pins sliding through the slots suitably. Any other mechanism that enables top chassis 104 to slide relative to bottom chassis 102 without separating therefrom may be encompassed in sliding mechanism 106 within the broad scope of the embodiments of the present disclosure.

Further, bottom chassis 102 and top chassis 104 may be of any suitable shape appropriate for their respective functions. The shapes shown in the figure are merely for illustrative purposes and are not to be construed as limitations. The shapes may vary according to the chassis and/or frame of the AV to which AUWR 100 is attached, forces acting on AUWR 100 during operation and transit and other considerations beyond the scope of the present disclosure.

AUWR 100 further comprises one or more arms, such as arm 108, protruding through corresponding slots, such as slot 110. In the example embodiment, two of arm 108 are shown with corresponding two of slot 110. Any number of arms may be used within the broad scope of the embodiments. Arm 108 is affixed to a latch 112 at its free end distant from top chassis 104. Latch 112 may slide along arm 108 using a sliding mechanism 114. In the embodiment shown, sliding mechanism 114 comprises pins and slots. In other embodiments, sliding mechanism 114 may comprise rails. Any suitable mechanism that allows latch 112 to slide forward and backward (i.e., away from top chassis 104 and toward top chassis 104) may be encompassed in sliding mechanism 114 within the broad scope of the embodiments of the present disclosure.

In some embodiments, latch 112 may comprise a horizontal clasp 116 configured to clasp an axle of a wheelchair horizontally. In some embodiments, latch 112 may comprise a vertical clasp 118 configured to clasp the axle of the wheelchair vertically. In some embodiments (e.g., as shown), latch 112 may comprise both horizontal clasp 116 and vertical clasp 118. Horizontal clasp 116 and/or vertical clasp 118 may be rotatable such that the axle can be locked and prevented from moving in the rotated position. For example, horizontal clasp 116 may clasp the axle horizontally and then rotate downwards around the axle so that the wheelchair is prevented from moving up or sliding forward. In another example, vertical clasp 118 may clasp the axle vertically and the rotate sideways around the axle so that the wheelchair is prevented from moving up or sliding forward.

In various embodiments, actuators 120 (not shown) may control movements of top chassis 104, arm 108 and latch 112. In some embodiments, actuators 120 may permit top chassis 104 to slide up and down in a vertical direction 122 along sliding mechanism 106. Actuators 120 may also permit latch 112 to slide forward and backward in a transverse direction 124 along sliding mechanism 114. Actuators 120 may further cause arm 108 to pivot around an axis 126 allowing arm 108 to rest vertically against, or parallel to, a vertical surface 128 of top chassis 104 such that arm 108 is not protruding outward. In such a configuration, arm 108 may be perpendicular a floor of the AV. In some embodiments, arm 108 may not protrude through slot 110; instead, arm 108 may be affixed with a hinge or other mechanism that enables arm 108 to rotate relative to top chassis 104. In various embodiments, actuators 120 may be located inside top chassis 104, and/or bottom chassis 102 and/or between latch 112 of arm 108 according to suitable needs, such as actuator type, movement desired, ease of manufacturability, etc.

Figure 2A:
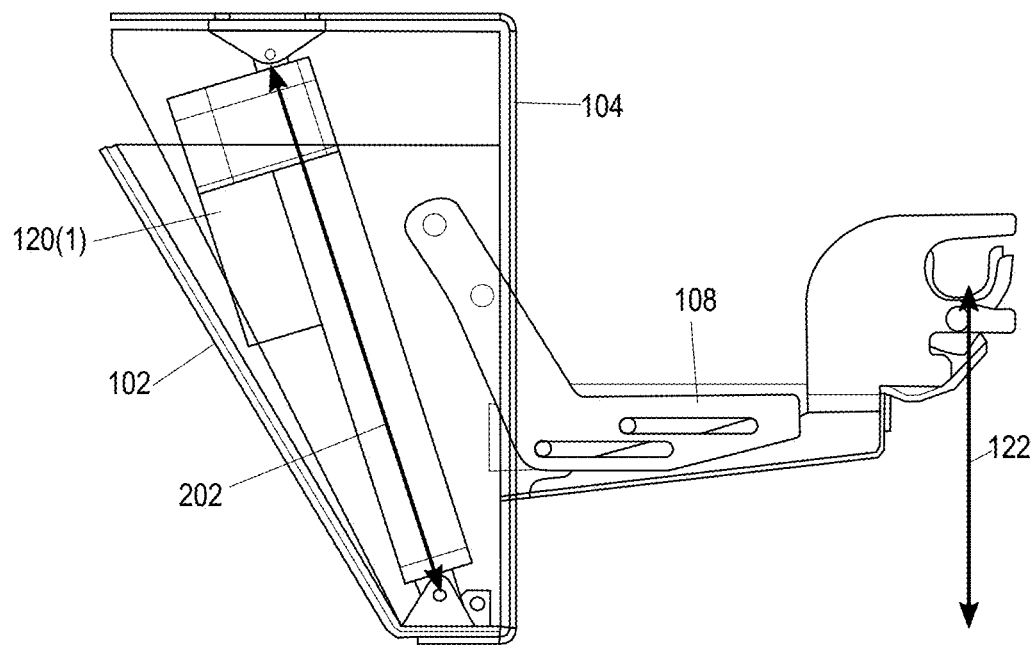
FIGS. 2A-2D illustrate various views of the AUWR showing example actuators in operation according to some embodiments of the present disclosure.
Figure 2B:
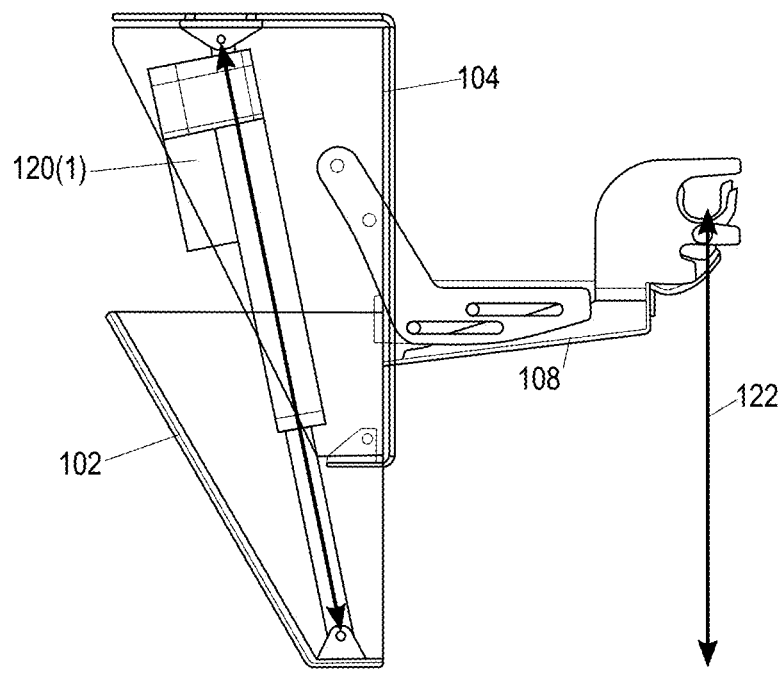

FIGS. 2A-2D illustrate operations of AUWR 100 according to an example embodiment of the present disclosure. In the example embodiment shown, AUWR 100 may comprise two actuators 120(1) and 120(2), attached to and enclosed behind top chassis 104. As shown in the example embodiment of FIG. 2A, actuator 120(1) may comprise a linear actuator having two ends, one end being attached to bottom chassis 102 and another opposing end being attached to top chassis 104. When actuator 120(1) is actuated, it moves linearly up (or down) along an axis 202, causing top chassis 104 to move in a vertical direction 122 relative to bottom chassis 102, thereby raising or lowering arm 108. FIG. 2B shows actuator 120(1) in an extended position, with top chassis 104 raised relative to bottom chassis 102. In an example embodiment, when actuator 120(1) is at its lowest position as shown in FIG. 2A, a length of actuator 120(1) may be 305 mm, and latch 112 may be 196 mm vertically from the AV's floor; when actuator 120(1) is at its most extended position along axis 202 as shown in FIG. 2B, the length of actuator 120(1) may be 452 mm, and latch 112 may be 348 mm vertically from the AV's floor. Note that other types of actuators may result in different travel and corresponding different heights of latch 112. Any suitable dimensions of actuator 120(1) may be used to enable securely grasping the wheelchair within the broad scope of the embodiments disclosed herein. In the example embodiment shown, there is no separate sliding mechanism 106 apart from actuator 120(1), which slides along axis 202.

Figure 2C:
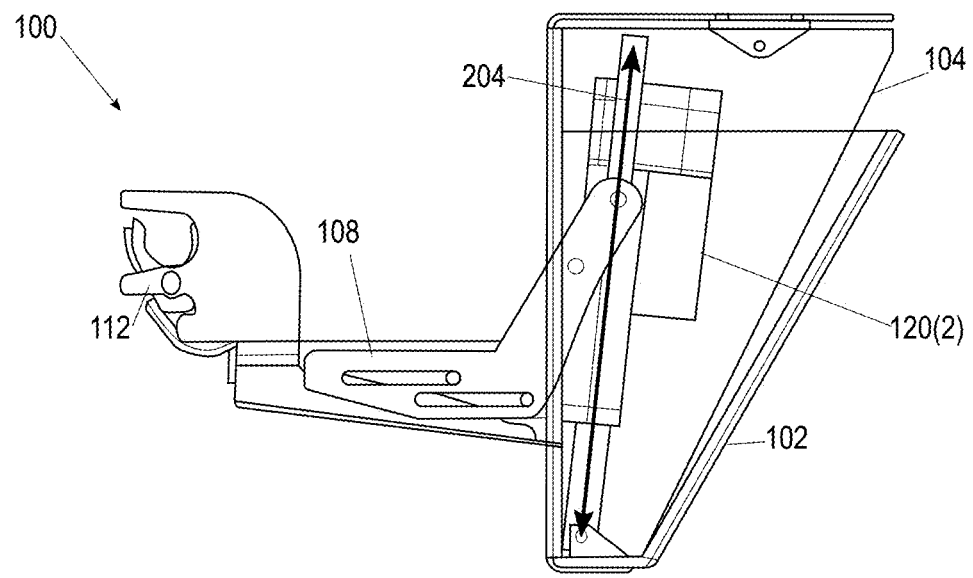
Figure 2D:
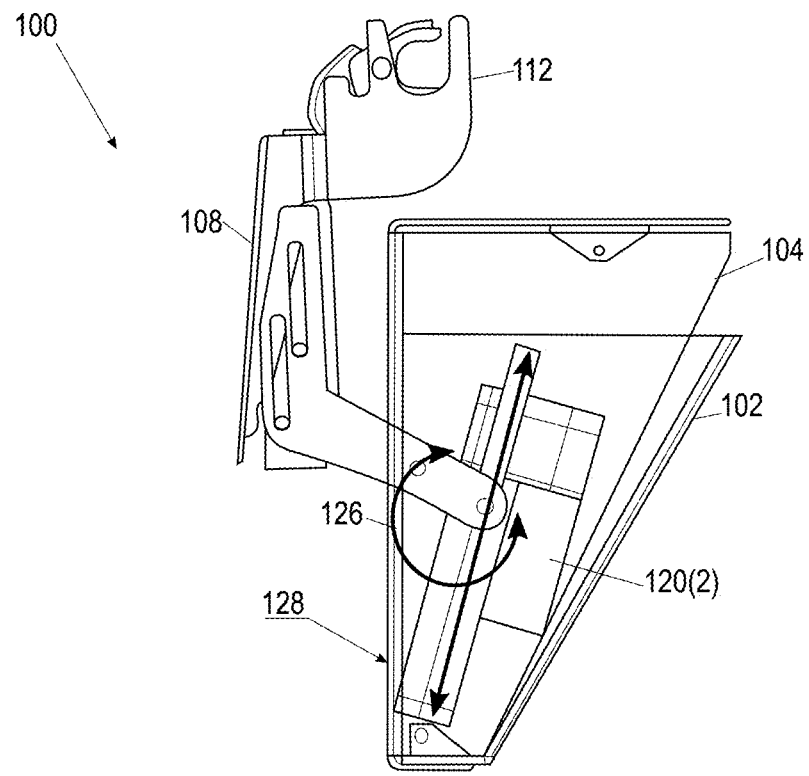

FIGS. 2C and 2D show the operation of actuator 120(2) in the example embodiment. In the example embodiment, actuator 120(2) may comprise a linear actuator with a shorter travel than actuator 120(1). Arm 108 may be attached to actuator 120(2) so that linear motion of actuator 120(2) along an axis 204 causes arm 108 to rotate (or pivot) around axis 126 from its horizontal latching position and rest vertically against, or parallel to, vertical surface 128 of top chassis 104. In an example embodiment, when AUWR 100 is deployed (e.g., to secure a wheelchair) as shown in FIG. 2C, a length of actuator 120(2) may be 287 mm; when AUWR 100 is stowed as shown in FIG. 2D, the length of actuator 120(2) may be 228 mm.

Although actuators 120(1) and 120(2) are described herein as linear actuators, actuators 120(1) and 120(2) may comprise any type of actuator that allows arm 108 to move vertically along direction 122 and pivot around axis 126, respectively, within the broad scope of the embodiments. Further, at least some of actuators 120(1) and 120(2) shown in the figure are piston and cylinder type of linear actuators. Other types of actuators suitable for the desired motion, such as servo motors that enable rotation, other types of linear actuators that enable linear motion, etc. are all encompassed in actuators 120 within the broad scope of the embodiments of the present disclosure.

Note that in various embodiments, bottom chassis 102 may be affixed to the AV's floor and/or frame. In some embodiments, bottom chassis 102 may also be affixed along its sides and/or back to the AV's frame for added rigidity. The shapes of bottom chassis 102 and top chassis 104 shown in the figure are merely for illustrative purposes and are not to be construed as limitations. The shapes may vary according to the frame of the AV to which AUWR 100 is attached, forces acting on AUWR 100 during operation and transit and other considerations beyond the scope of the present disclosure.

Figure 3:
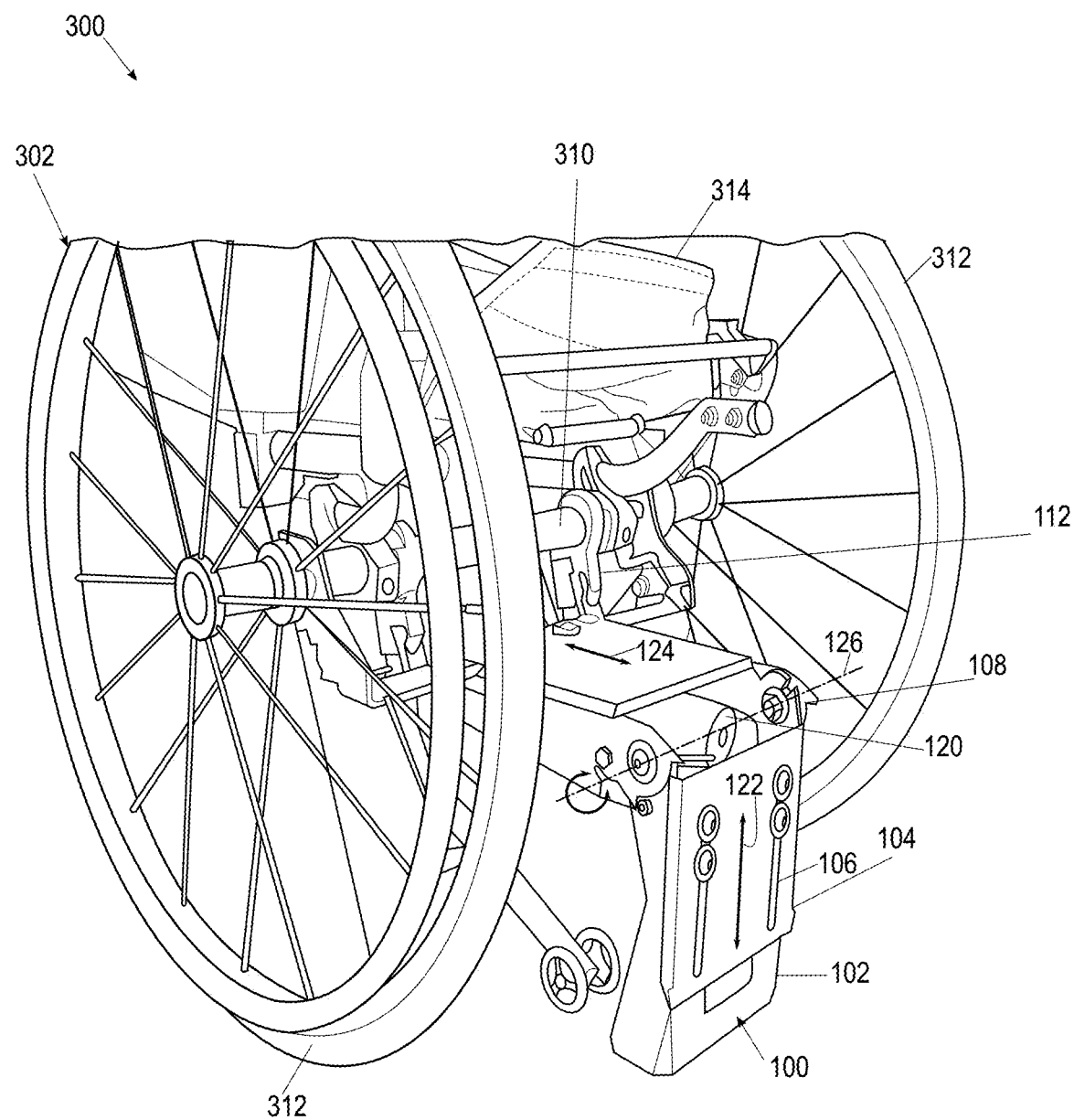
FIG. 3 illustrates the AUWR latched to an unoccupied wheelchair according to some embodiments of the present disclosure.

FIG. 3 illustrates a portion of an assembly 300 comprising a wheelchair 302 secured by AUWR 100. In the embodiment shown, sliding mechanism 106 that allows top chassis 104 to slide relative to bottom chassis 102 comprises pins and slots mechanism, with the slots provided in top chassis 104 and pins affixed to bottom chassis 102. Further, in the embodiment shown, arm 108 may be affixed by a rotatable hinge to top chassis 104 so that it is configured to rotate around pivot axis 126 to drop down and rest perpendicular to the vehicle floor, for example, vertically, when not in use. In such an inoperative position, latch 112 may be proximate to the vehicle floor. In other embodiments, arm 108 may be configured to rotate around pivot axis 126 in the opposite direction, such that when arm 108 is perpendicular to the vehicle floor in the inoperative position, latch 112 is distant from the vehicle floor.

During operation, actuators 120 may cause arm 108 to rotate around pivot axis 126 from an inoperative position perpendicular to the vehicle floor to an operative position parallel to the vehicle floor. Actuators 120 may cause latch 112 to extend forward (i.e., away from top chassis 104 toward wheelchair 302) along transverse direction 124 (i.e., parallel to the floor of the vehicle floor) to grasp an axle 310 of wheelchair 302 securely. Axle 310 attaches wheels 312 of wheelchair laterally beneath seat 314. In the embodiment shown, wheelchair 302 is positioned such that AUWR 100 is between wheels 312 of wheelchair 302. Because of the downward forces acting on arm 108, AUWR 100 may not be configured to operate with an occupant in wheelchair 302 in some embodiments.

The appropriate position (e.g., height from vehicle floor, distance from top chassis 104, etc.) of latch 112 to grip axle 310 may be obtained by a controller (not shown) which directs actuators 120 using any suitable means, for example, through electrical control signals over a wired connection. In one embodiment, the owner/occupant of wheelchair 302 may answer a survey before riding that provides information to the controller about wheelchair 302, such as wheel diameter (from which the position of axle 310 may be deduced). In another embodiment, the owner/occupant of wheelchair 302 may use button controls inside the AV to adjust the position of the latches to wheelchair 302. The button controls may be provided in a remote control coupled to actuators 120. The remote control may be coupled to the controller, which then directs actuators 120 accordingly. In yet another embodiment, sensors such as low-cost single plane Light Detection and Ranging (LIDAR) sensors may be used to automatically detect the position of axle 310 as wheelchair 302 moves into position proximate to AUWR 100. The sensors may provide the data to the controller, which then directs actuators 120 accordingly. In yet other embodiments, a preset configuration may be stored in the controller, which directs actuators 120 according to the present configuration such that latch 112 automatically returns to the desired position on future trips without further work from the wheelchair owner/occupant. In some embodiments, for example, where the wheelchair information in known prior to the wheelchair occupant entering the AV, AUWR 100 may be actuated by the controller and moved into the appropriate position for the particular wheelchair before the wheelchair occupant enters the AV.

Figure 4:
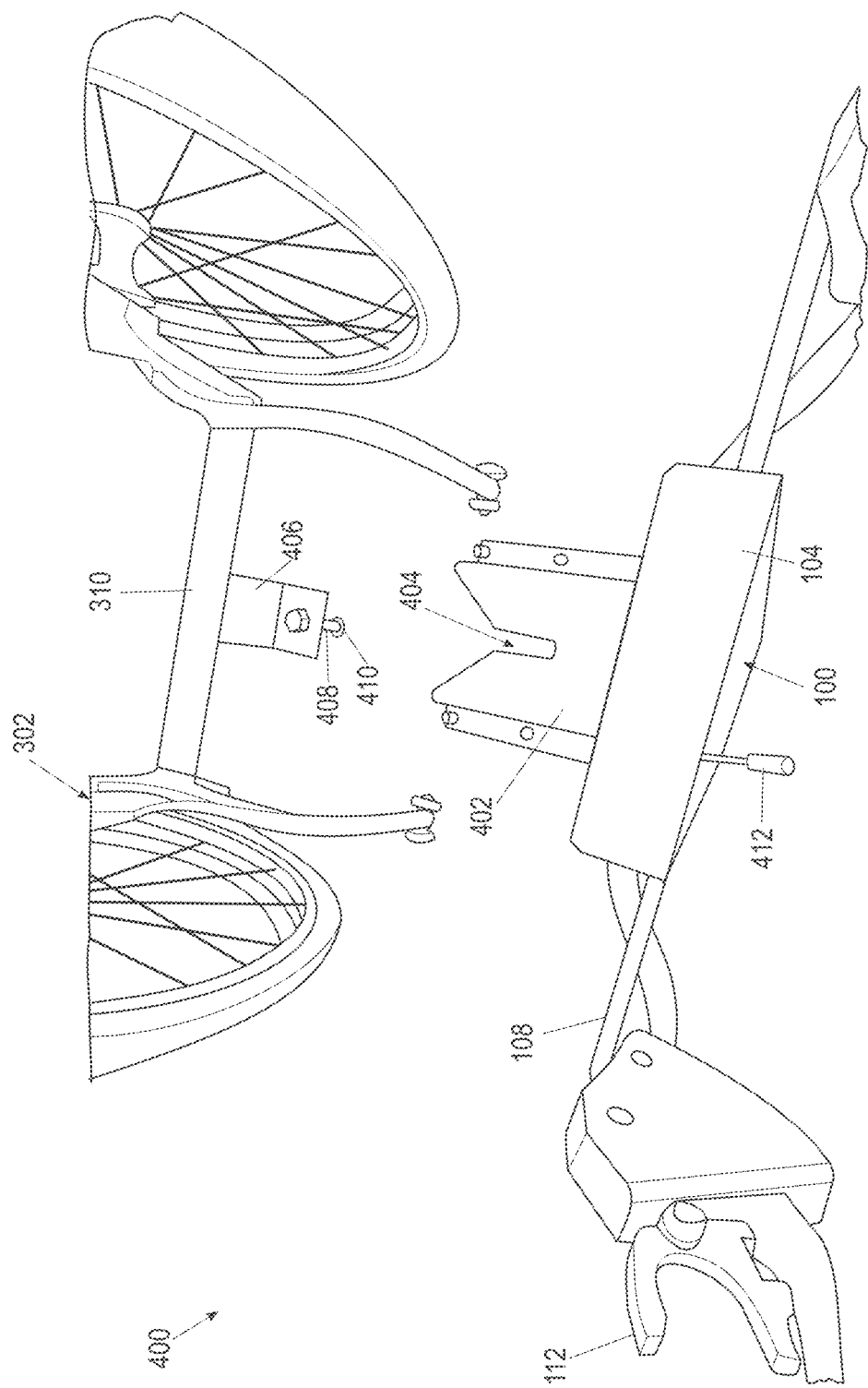
FIG. 4 illustrates an example occupied wheelchair restraint (OWR) according to some embodiments of the present disclosure.

FIG. 4 illustrates an autonomous wheelchair securement system 400 comprising AUWR 100 and an OWR 402 configured to secure wheelchair 302. OWR 402 is affixed to the vehicle floor, for example, using nuts and bolts or other attachment means. OWR 402 comprises a slot 404 configured to accept an adapter 406 on wheelchair 302. Adapter 406, which is affixed to wheelchair 302, comprises a pin 408 having a pinhead 410. A diameter of pin 408 may be smaller than a width of slot 404, and a diameter of pinhead 410 is greater than the width of slot 404. During securement of wheelchair 302 to OWR 402, pin 408 may slide through slot 404 because the diameter of pin 408 is smaller than the width of slot 404, but pin 408 cannot be removed vertically because the diameter of pinhead 410 is greater than width of slot 404. A latch (not shown) in OWR 402 may lock pin 408 in place to prevent sliding forward, thus securely locking wheelchair 302 in place. Because there are no downward forces exerted on any member of OWR 402, wheelchair 302 may be occupied when secured.

In some embodiments (e.g., as shown), AUWR 100 may be placed in an inoperative position, with latch 112 in its vertical resting position when wheelchair 302 is secured to OWR 402. In such embodiments, AUWR 100 may be actuated by actuators 120 (not shown) to move to the inoperative position so that it does not interfere with securement of wheelchair 302 to OWR 402. In the embodiment shown, latch 112 may be operated by actuators directly affixed thereto. Other actuators may be located within the enclosure of top chassis 104. AUWR 100 may be placed in the inoperative position in cases where the wheelchair dimensions are such that arm 108 of AUWR 100 would interfere with parts of wheelchair 302, for example, a motor (in cases where wheelchair 302 is motorized).

In some other embodiments, AUWR 100 may also be used together with OWR 100 for added security. In such embodiments, during operation, AUWR 100 may be actuated by actuators 120 such that arm 108 is moved into the operative position where latch 112 may grasp axle 310 suitably. The combined operation of AUWR 100 and OWR 402 may permit securement of wheelchair 302 whether or not occupied when the AV is in motion. A lever 412 may be provided in AUWR 100 and/or OWR 402 to enable manual release of wheelchair 302 in the event of power failure or other emergency when actuators 120 are not operating.

Figure 5:
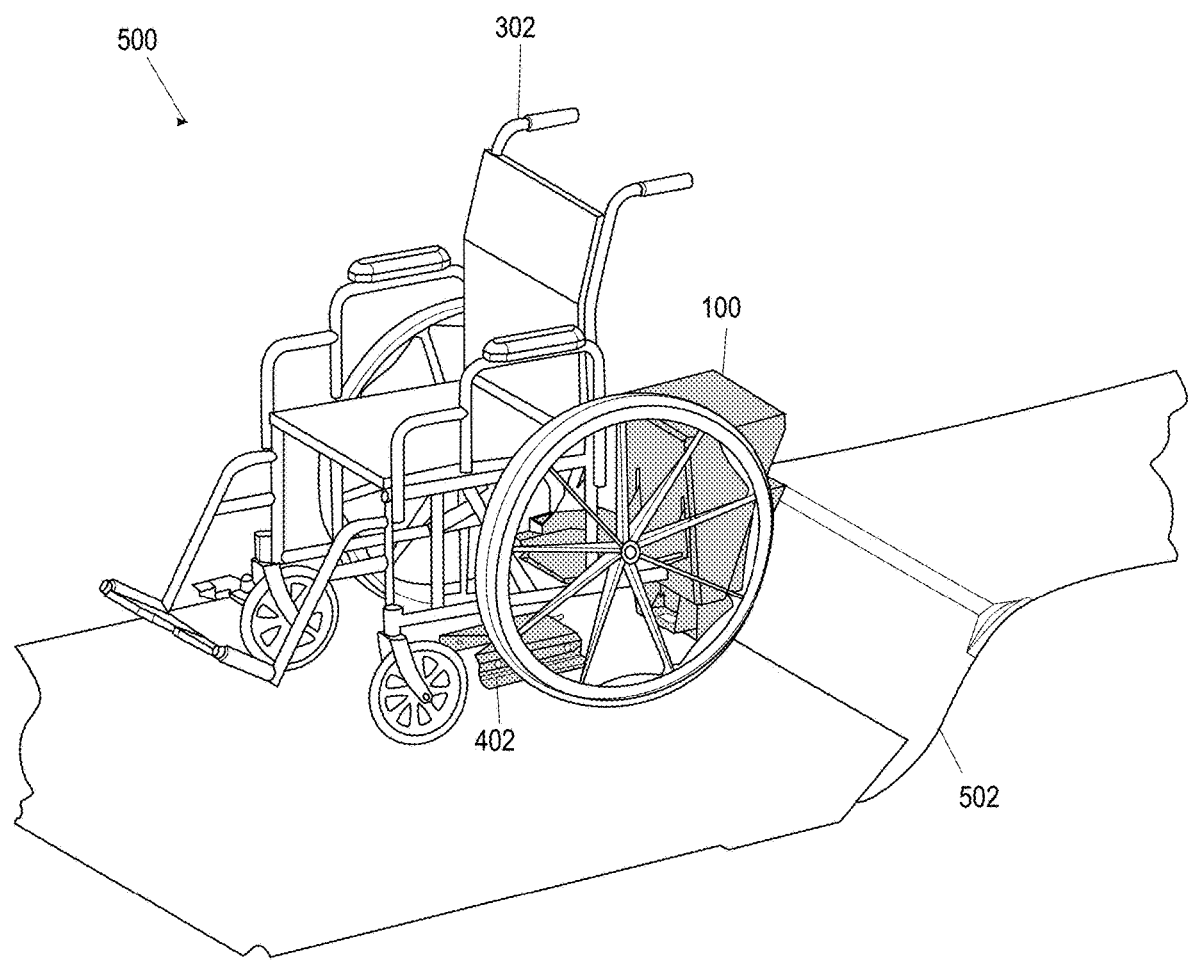
FIG. 5 illustrates an example configuration of the AUWR and OWR with a wheelchair in an AV according to some embodiments of the present disclosure.

FIG. 5 illustrates an example configuration 500 with a wheelchair 302 restrained by AUWR 100 and/or by OWR 402. AUWR 100 and OWR 402 are fastened to vehicle floor 502. In various embodiments, vehicle floor 502 may be part of the chassis and/or frame of the AV. In other embodiments, vehicle floor 502 may be an additional part or parts, for example, a false floor, attached to the chassis and/or frame of the AV. The shape of AUWR 100 may be configured according to the shape of vehicle floor 502, for example, to enable reliable and robust attachment thereto. The shape of AUWR 100 shown in the figure is merely for illustrative purposes and is not to be construed as a limitation. The shape may vary according to the shape of vehicle floor 502 to which AUWR 100 is attached, forces acting on AUWR 100 during operation and transit and other considerations beyond the scope of the present disclosure.

Having both AUWR 100 and OWR 402 in a space occupiable by a single wheelchair 302 may enable a compact configuration applicable to a wide variety of wheelchair makes and models, without sacrificing valuable cabin space inside the AV. Such a configuration is advantageous over another configuration in which AUWR 100 and OWR 402 are placed side-by-side, for example. Further with configuration 500 in which both AUWR 100 and OWR 402 are in line with each other in a space occupiable by a single wheelchair 302, three different operative modes are possible: (1) a first mode in which AUWR 100 is operational and OWR 402 is not operational; (2) a second mode in which AUWR 100 is not operational, and OWR 402 is operational; and (3) a third mode in which both AUWR 100 and OWR 402 are operational. In the first and third modes, arm 108 of AUWR 100 is extended and grasps acle 310 of wheelchair 302; in the second mode, arm 108 of AUWR 100 is moved away from interfering with wheelchair 302.

Figure 6:
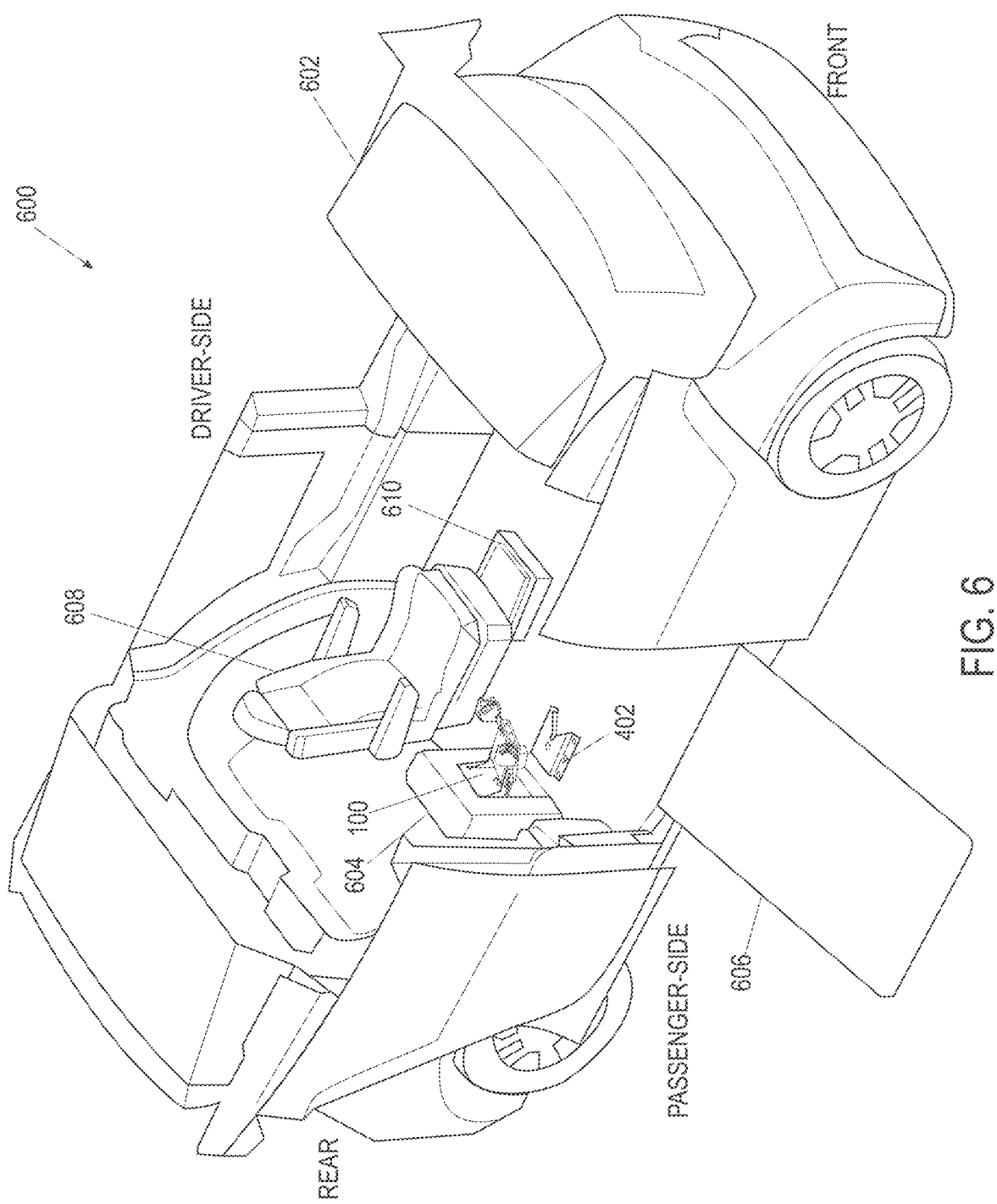
FIG. 6 illustrates the example configuration of the AUWR and OWR alongside a transfer seat in an example AV according to some embodiments of the present disclosure.

FIG. 6 illustrates an example configuration 600 with an AV 602. AV 602 is shown without its roof to enable a clearer view of the inside its main cabin. AV 602 is equipped with AUWR 100 and OWR 402 on its rear passenger-side row of seats, with wheelchair 302 (not shown) facing toward the front. AUWR 100 may be located wholly or partially inside an enclosure 604 that houses other electronics, for example, the controller that controls actuators 120. In the picture shown, AUWR 100 is in the extended position, ready to engage with wheelchair 302. AUWR 100, OWR 402 and enclosure 604 may be securely fastened to the chassis and/or frame of AV 602, for example, vehicle floor 502. AV 602 may also be fitted with a ramp 606 that may be extended when needed and retracted when not needed, for example, so that the doors of AV 602 can be closed. Ramp 606 may enable wheelchair 302 to enter and exit AV 602 easily.

AV 602 may also be configured with a transfer seat 608 alongside the space occupiable by wheelchair 302. Transfer seat 608 may be used to enable a wheelchair occupant to move thereinto and engage AUWR 100 to secure the now unoccupied wheelchair 302. In various embodiments, transfer seat 608 may be configured with a TSB 610 that enables moving transfer seat 608 forward and backward according to the dimensions of wheelchair 302. In various embodiments, AUWR 100 may be configured to raise or lower wheelchair 302 so that the seat of wheelchair 302 is in line with the seat of transfer seat 608 to enable the wheelchair occupant to move comfortably and easily to transfer seat 608.

In various embodiments, AV 602 is preferably a fully autonomous automobile, but may additionally or alternatively be any semi-autonomous or fully autonomous vehicle; e.g., a boat, an unmanned aerial vehicle, a self-driving car, etc. Additionally, or alternatively, AV 602 may be a vehicle that switches between a semi-autonomous state and a fully autonomous state and thus, the AV may have attributes of both a semi-autonomous vehicle and a fully autonomous vehicle depending on the state of the vehicle.

AV 602 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). AV 602 may additionally or alternatively include interfaces for control of any other vehicle functions, e.g., windshield wipers, headlights, turn indicators, air conditioning, etc.

AV 602 includes a sensor suite, which may include a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, etc. The sensors may be located in various positions in and around AV 602. For example, the sensor suite may include multiple cameras mounted at different positions on AV 602, including within the main cabin for passengers and/or deliveries.

An onboard computer may be connected to the sensor suite and functions to control AV 602 and to process sensed data from the sensor suite and/or other sensors in order to determine the state of AV 602. Based upon the vehicle state and programmed instructions, the onboard computer modifies or controls behavior of AV 602. In addition, the onboard computer may provide instructions and/or data to the controller that controls actuators 120 of AUWR 100 and other AV components used for wheelchair securement, including movement of ramp 606, and transfer seat 608.

Figure 7:
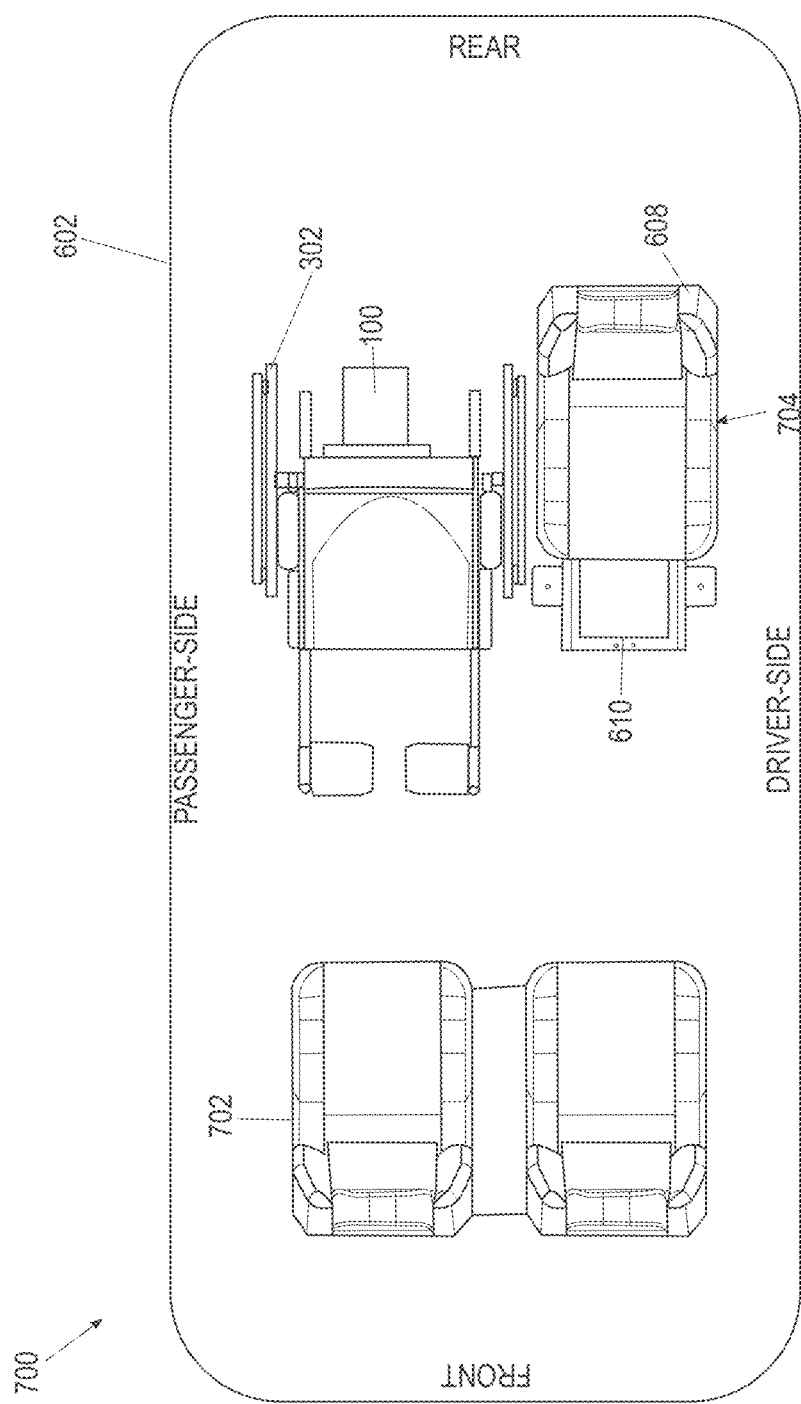
FIG. 7 illustrates an example configuration of seats in an AV fitted with the AUWR and OWR according to some embodiments of the present disclosure.

FIG. 7 illustrates a simplified diagram of a main cabin 700 in AV 602. Main cabin 700 includes at least two rows of seats. In an example embodiment, a first row 702 comprises two rear-facing passenger seats. A second row 704 comprises the space for wheelchair 302, including AUWR 100 and OWR 402 (not shown) and transfer seat 608 on TSB 610. Transfer seat 608 and wheelchair 302 are front-facing, positioned toward the rear of AV 602 in some embodiments. Such a position in the rear, facing forward to the front of AV 602, allows AUWR 100 to be attached securely to vehicle floor 502 of AV 602 while permitting wheelchair 302 to face other passenger seats in main cabin 700. In some embodiments, the space for wheelchair 302 may be located proximate to the passenger-side, mainly for safety and ease of getting on and off AV 602 using ramp 606 (not shown) from a curb. In some embodiments where safety getting in and out of AV 602 from the driver-side is not of concern (e.g., in the case of an AV boat docked at a pier), ramp 606 may be provided on both sides or on the driver-side, and the space for wheelchair 302 may be located on the driver-side proximate to ramp 606.

Figure 8A:
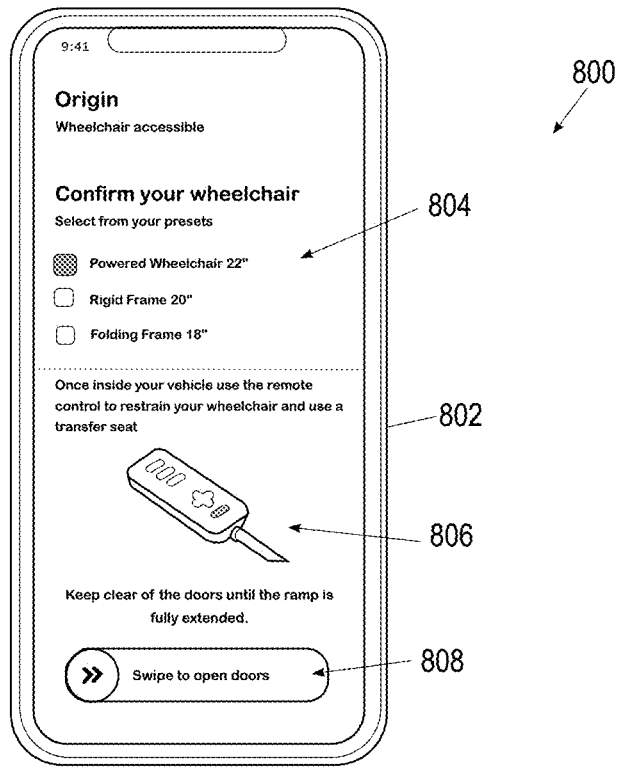
FIGS. 8A and 8B illustrate example phone application and remote control used in conjunction with the autonomous wheelchair securement device according to some embodiments of the present disclosure.

FIG. 8A illustrates an example user interface of an application software ("app") 800 executing in an electronic device 802. In the embodiment shown, electronic device 802 comprises a phone. In other embodiments, electronic device 802 may comprise a laptop, tablet computer, or other such device configured to execute apps suitably. App 800 may comprise a configuration portion 804 enabling a user to input wheelchair dimensions, make, model, etc. In some embodiments, options presented to the user in configuration portion 804 may be preset, for example, among a few choices. In other embodiments, configuration portion 804 may permit the user to input configuration information freely without being restrained to a few choices. In yet other embodiments, configuration portion 804 may present options previously saved for that user, for example, based on a previous ride and/or booking. In many embodiments, the user may input the configuration information during a booking of the vehicle for ride-share purposes and these options may be presented again for confirmation in configuration portion 804 when the vehicle is ready to be boarded. Any suitable means to enter configuration information of wheelchair 302 may be encompassed in configuration portion 804 within the broad scope of the embodiments of the present disclosure.

App 800 may also comprise an instruction portion 806 that provides specific instructions on using the securement device inside the AV. App 800 may further comprise a command portion 808 that allows the user to directly control operations of the wheelchair securement system, including the doors of AV 602, ramp 606, AUWR 100, OWR 402, and TSB 610 (among other components).

Figure 8B:
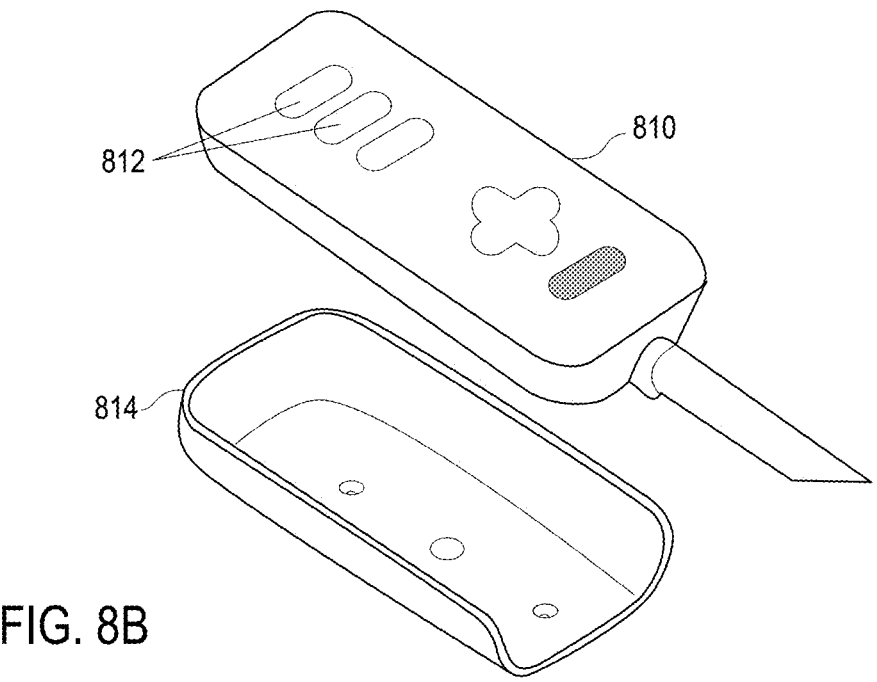

FIG. 8B illustrates a remote control 810 used in conjunction with app 800 for operating the wheelchair securement system in AV 602. In some embodiments, instructions for operating remote control 810 may be provided in app 800. In other embodiments, remote control 810 may be operated intuitively, for example, according to control buttons 812 presented on remote control 810. In some embodiments, remote control 810 may be coupled with a wired connection to the wheelchair securement system; in other embodiments, remote control 810 may communicate wirelessly with the wheelchair securement system. In many embodiments, a protective holder 814 attached within AV 602, for example, to transfer seat 608, may be provided to hold remote control 810 when not in use. The user may update movements of the wheelchair securement system, including ramp 606, AUWR 100 and/or OWR 402 using remote control 810. For example, buttons 812 may include options to lock AUWR 100 and/or OWR 402, unlock AUWR 100 and/or OWR 402, move arm 108 and/or latch 112 of AUWR 100 up or down, forward or backward, etc.

In some embodiments, remote control 810 may include buttons 812 to control TSB 610 in addition to AUWR 100 and/or OWR 402. For example, suitable buttons 812 may permit the user to move transfer seat 608 forward, backward, up, down, left, or right as needed to align with wheelchair 302 so that the wheelchair occupant can comfortably and safely move from wheelchair 302 to transfer seat 608. In some embodiments one of buttons 812 may comprise a "home" position that permits the wheelchair securement system, including ramp 606, TSB 610, AUWR 100 and/or OWR 402 to return to their default positions. In some embodiments, a light emitting diode (LED) indicator may signal when the wheelchair restraint system is safe to use, unlocked, locked, etc.

Figure 9:
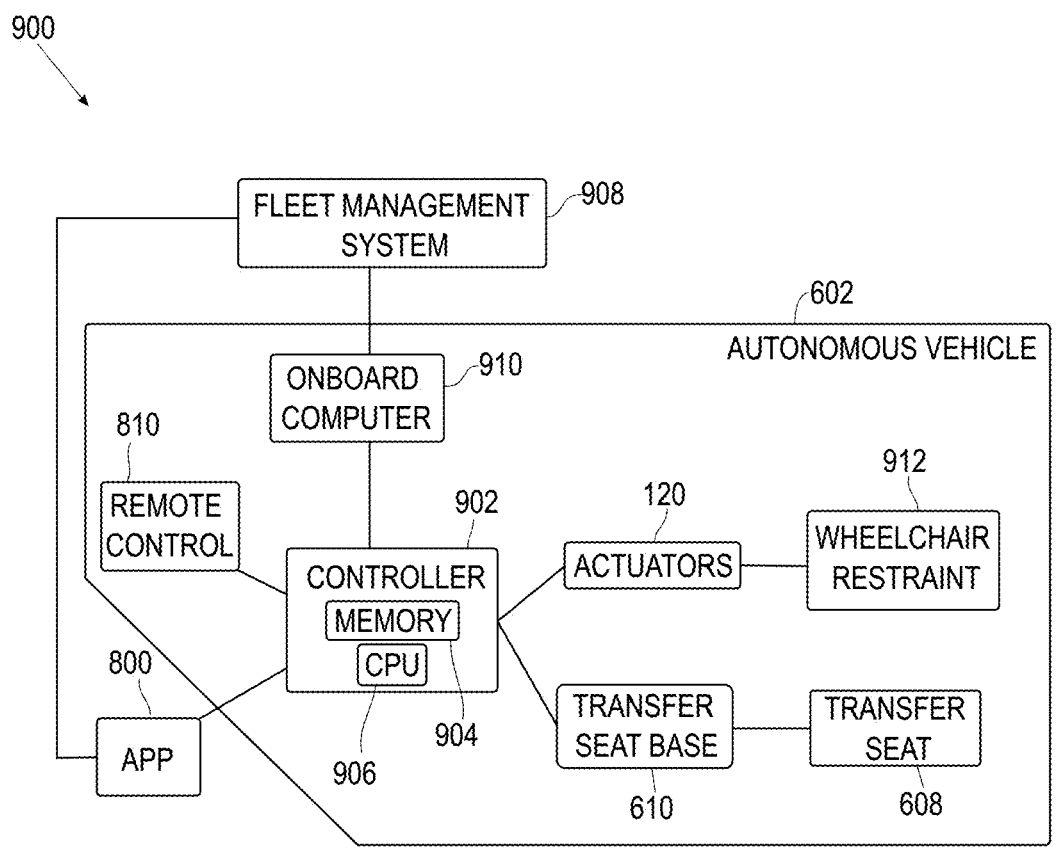
FIG. 9 is a block diagram of a control system used for the autonomous wheelchair securement device in an AV according to some embodiments of the present disclosure.

FIG. 9 is a simplified block diagram of a wheelchair securement system 900 according to various embodiments of the present disclosure. Wheelchair securement system 900 comprises a controller 902 in AV 602 having a memory 904 and a processor 906, for example, a central processing unit (CPU). In various embodiments, controller 902 comprises electrical and electronic circuits, including microprocessors, microcontrollers, interfaces, and/or other components known in the art to function together to receive request signals, generate control signals, and communicate the generated control signals to appropriate elements. For example, controller 902 may comprise a comparative device that receives a value (e.g., of a process variable) in an input electrical signal, compares the value with that of a predetermined control point value (e.g., set point) stored in memory 904, and determines an appropriate amount of output signal configured to provide corrective action within a control loop, for example, using digital algorithms by processor 906.

App 800 outside AV 602 and remote control 810 inside AV 602 may communicate with controller 902 suitably. For example, app 800 may communicate with controller 902 directly by wireless means in some embodiments. In other embodiments, app 800 may communicate with a fleet management system 908, which in turn communicates with an onboard computer 910 in AV 602, which in turn communicates with controller 902. In some embodiments, onboard computer 910 may communicate with controller 902 without any directions or instructions from fleet management system 908, for example, in situations where instructions to operate controller 902 are provided (e.g., saved) locally in onboard computer 910.

Onboard computer 910 may be connected to the sensor suite in AV 602 and functions to control AV 602 and to process sensed data from the sensor suite and/or other sensors in order to determine the state of AV 602 and the wheelchair securement system in AV 602. Based upon the vehicle state and programmed instructions, onboard computer 910 modifies or controls behavior of AV 602 and wheelchair securement system in AV 602. In addition, onboard computer 910 may provide instructions and/or data to controller 902 and other AV components, including ramp 606, and transfer seat 608.

Onboard computer 910 is a general-purpose computer adapted for I/O communication with vehicle control systems and the sensor suite but may additionally or alternatively be any suitable computing device. In some embodiments, onboard computer 910 is connected to the Internet via a wireless connection (e.g., via a cellular data connection). Additionally or alternatively, onboard computer 910 may be coupled to any number of wireless or wired communication systems.

Fleet management system 908 manages a fleet of AVs, including AV 602. Fleet management system 908 may manage one or more services that provide or use the AVs, e.g., a service for providing rides to users with wheelchairs. Fleet management system 908 may select an AV from the fleet of AVs to perform a particular service or other task and instruct the selected AV to autonomously drive to a particular location (e.g., a delivery address). Fleet management system 908 may select a route for AV 602 to follow. Fleet management system 908 may also manage fleet maintenance tasks, such as charging, servicing, and cleaning of the AV. AV 602 communicates with the fleet management system using wireless means, for example, over a public network, such as the Internet. Fleet management system 908 may further enable AUWR 100 to position arm 108 and latch 112 to be compatible with wheelchair 302 of a prospective rider before the rider enters AV 602.

Controller 902 may operate actuators 120 and TSB 610 using available instructions, for example, obtained through app 800, or remote control 810, or onboard computer 910. In some embodiments, the instructions may be stored locally in memory 904 in controller 902. In some embodiments, wheelchair presets (e.g., configuration information) may also be stored in memory 904. CPU 906 may execute the instructions or generate instructions according to the wheelchair presets in memory 904 suitably and execute them appropriately to generate instructions, for example, electrical control signals. Actuators 120 may operate elements of wheelchair restraint 912 according to the instructions from controller 902.

Wheelchair restraint 912 comprises AUWR 100 and OWR 402 in many embodiments. Actuators 120 may control movement of arm, latches, chassis and locks in AUWR 100 and OWR 402 suitably, according to instructions from controller 902. TSB 610 may operate transfer seat 608 suitably according to instructions from controller 902. The instructions may comprise, for example, the distance to move forward (or backward) and the height to raise or lower transfer seat 608 to be aligned with the user's wheelchair. In some embodiments, controller 902 may comprise separate controllers for actuators 120 and TSB 610. In other embodiments controller 902 may operate both actuators 120 and TSB 610 suitably.

Example Methods

Figure 10:
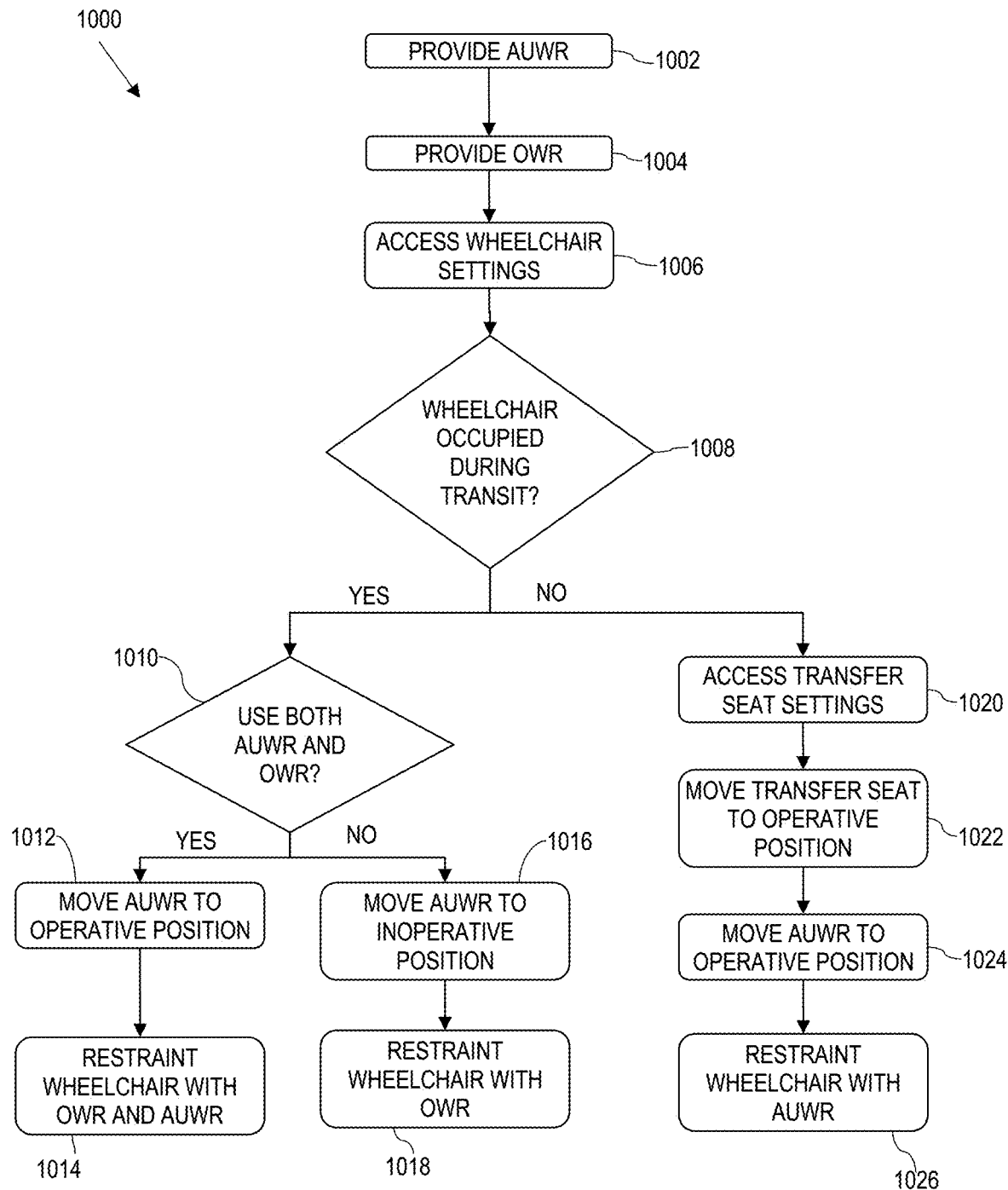
FIG. 10 is a flowchart of an example process for implementing and operating a securement device in an AV according to some embodiments of the present disclosure.

FIG. 10 is a simplified flow diagram illustrating various operations 1000 that may be associated with wheelchair securement system 900 according to embodiments of the present disclosure. At 1002, AUWR 100 may be provided. At 1004, OWR 402 may be provided. At 1006, wheelchair settings (e.g., wheelchair make, model, dimensions, etc.) of wheelchair 302 may be accessed by controller 902. At 1008, a determination may be made whether wheelchair 302 will be occupied during transit. The determination may be made based on user inputs in app 800 in some embodiments. In other embodiments, the determination may be made based on user inputs through remote control 810. In yet other embodiments, the determination may be made based on user behavior and/or settings in previous rides, such information being retrieved from onboard computer 910 or otherwise stored in memory 904 of controller 902.

If wheelchair 302 will be occupied during transit, the operations step to 1010, at which another determination may be made whether to use both AUWR 100 and OWR 402. The determination may be made based on the wheelchair settings, for example, dimensions, components, etc. that would permit controller 902 to conclude that AUWR 100 can latch onto axle 310 of wheelchair 302 without interference from other parts of the wheelchair. If the determination is made that both AUWR 100 and OWR 402 are to be used, the operations step to 1012, at which AUWR 100 is moved into an operative position, for example, with arm 109 and latch 112 at the right position and location to latch onto axle 310 of wheelchair 302 when placed proximate to AUWR 100. At 1014, wheelchair 302 may be restrained with AUWR 100 and OWR 402 suitably. If, at 1010, the determination is made that both AUWR 100 and OWR 402 are not to be used, the operations step to 1016, at which AUWR 100 is moved into an inoperative position, for example, with arm 108 and latch 112 away from wheelchair 302 (e.g., perpendicular to vehicle floor 502). In many embodiments, OWR 402 may also be simultaneously unlocked to enable it to couple to adapter 406. At 1018, wheelchair 302 is restrained with OWR 402 using adapter 406.

If at 1008, the determination is made that wheelchair 302 will not be occupied during transit, the operations step to 1020, at which controller 902 may access the transfer seat settings, for example, from memory 904 or onboard computer 910. At 1022, controller 902 may instruct TSB 610 to move transfer seat 608 to an operative position, for example, aligned suitably with wheelchair 302. At 1024, AUWR 100 is moved to the operative position, with arm 108 and latch 112 at the right position and location to latch onto axle 310 of wheelchair 302 when placed proximate to AUWR 100. At 1026, wheelchair 302 is restrained with AUWR 100 suitably.

Figure 11:
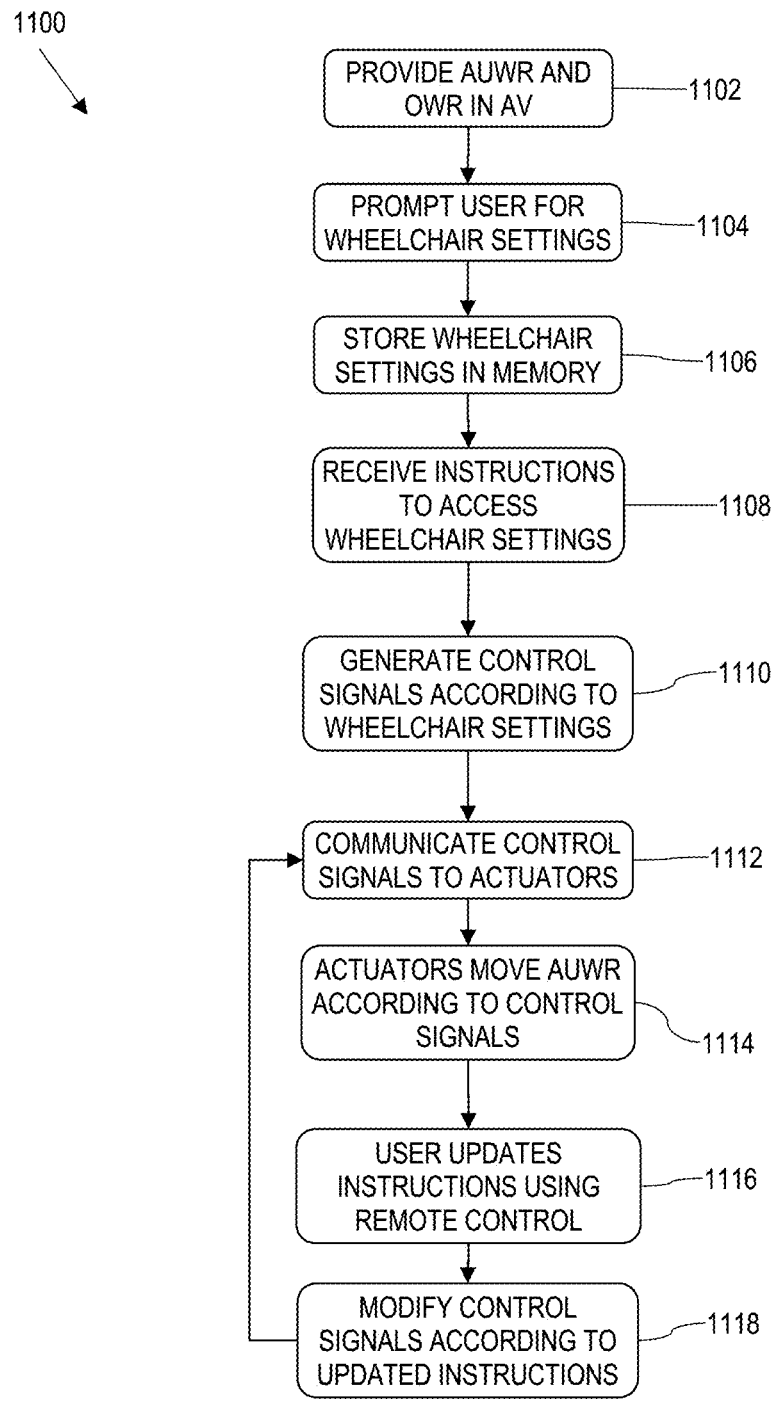
FIG. 11 is a flowchart of another example process for implementing and operating a securement device in an AV according to some embodiments of the present disclosure.

FIG. 11 is a simplified flow diagram illustrating various operations 1100 that may be associated with wheelchair securement system 900 according to embodiments of the present disclosure. At 1102, AUWR 100 and OWR 402 may be provided in AV 602. At 1104, the user (e.g., wheelchair occupant, rider, etc. who uses app 800 or avails the ride-sharing services managed by fleet management system 908) may be promoted for wheelchair settings. In some embodiments, this prompting may be performed through the user interface of app 800. In other embodiments, this prompting may be performed through other means, for example, the ride-sharing software used by fleet management system 908. At 1106, the user input wheelchair settings may be stored in memory. In some embodiments, the memory storing the wheelchair settings may be located in devices associated with fleet management system 908. In other embodiments, the memory storing the wheelchair settings may be located in onboard computer 910. In yet other embodiments, the memory storing the wheelchair settings may comprise memory 904 of controller 902.

At 1108, instructions may be received to access wheelchair settings. In some embodiments, the instructions may be received at onboard computer 910, for example, when AV 602 is made ready for the ride requested by the wheelchair user. In other embodiments, the instructions made be received at controller 902, for example, when AV 602 is at the pickup location of the wheelchair user and wheelchair restraints 912 is to be made ready to receive wheelchair 302. At 1110, controller 902 may generate control signals according to the wheelchair settings accessed and retrieved from memory. At 1112, controller 902 may communicate the control signals to actuators 120. At 1114, actuators 120 may move AUWR 100 (and unlock OWR 402 as needed) according to control signals received from controller 902. At 1116, the user may update instructions using remote control 810. For example, the user may want to move to transfer seat 608. At 1118, controller 902 may modify control signals according to the updated instructions. The operations loop back to 1112 with the modified control signals and continue until the user is satisfied and the wheelchair is secured.

Figure 12:
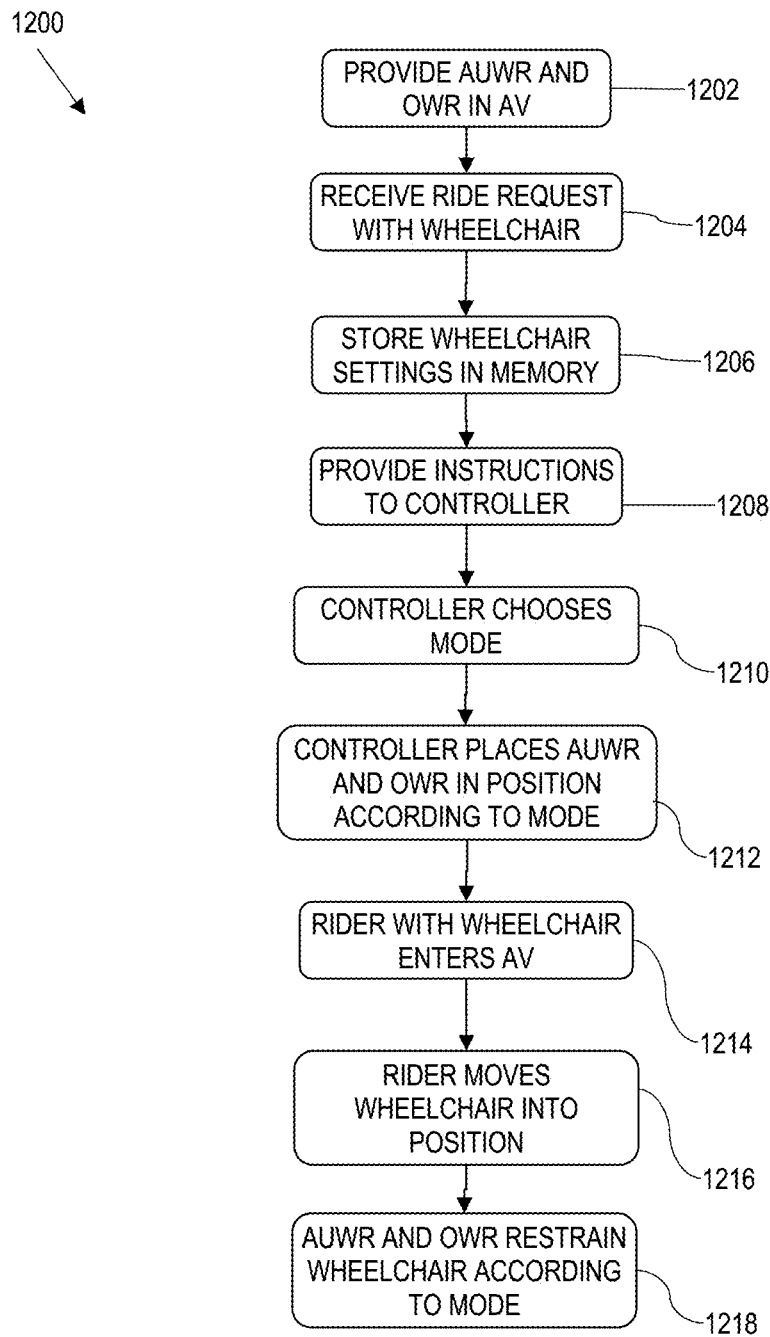
FIG. 12 is a flowchart of yet another example process for implementing and operating a securement device in an AV according to some embodiments of the present disclosure.

FIG. 12 is a simplified flow diagram illustrating various operations 1200 that may be associated with wheelchair securement system 900 according to embodiments of the present disclosure. At 1202, AUWR 100 and OWR 100 may be provided in AV 602. At 1204, a ride request with wheelchair may be received at fleet management system 908. At 1206, the rider's wheelchair settings are obtained and stored in memory suitably. At 1208, instructions are provided to controller 902. At 1210, controller 902 chooses mode of operation from among three modes: a first mode in which wheelchair 302 is not occupied and AUWR 100 alone is used to restrain wheelchair 302; a second mode in which wheelchair 302 is occupied and/or otherwise fitted with adapter 406 and OWR 402 alone is used to restrain wheelchair 302; and a third mode in which wheelchair 302 is occupied and/or otherwise fitter with adapter 406 and both AUWR 100 and OWR 402 are used to restrain wheelchair 302. The selection may be made based on user inputs about ride preferences, wheelchair dimensions, make, model, etc.

At 1212, controller 902 places AUWR 100 and OWR 402 in position (e.g., operative position or inoperative position; locked or unlocked) according to the selected mode. At 1214, the rider with wheelchair 302 enters AV 602. At 1216, the rider moves wheelchair 302 into position proximate to AUWR 100 and OWR 402. At 1218, AUWR 100 and/or OWR 402 restrain wheelchair 302 according to the selected mode.

Although FIGS. 10-12 illustrate various operations performed in a particular order, this is simply illustrative, and the operations discussed herein may be reordered and/or repeated as suitable. For example, one or more operations may be performed in parallel to secure wheelchair 302 and align transfer seat 608 substantially simultaneously. In another example, the operations may be performed in a different order to reflect the preferences of a particular user. Numerous other variations are also possible to achieve the desired wheelchair securement. Further, additional processes which are not illustrated may also be performed without departing from the scope of the present disclosure. For example, the operations may include various data accessing operations, instructions generations, execution of instructions, movement of actuators and/or other elements of the system.

SELECT EXAMPLES

Example 1 provides a wheelchair securement system for a vehicle comprising: a first wheelchair restraint comprising a latch configured to grasp an axle of a wheelchair; a second wheelchair restraint comprising a mechanism to securely couple with an adapter on the wheelchair; and a controller configured to select from among one of three selections: a first mode of securing the wheelchair with the first wheelchair restraint alone; a second mode of securing the wheelchair with the second wheelchair restraint alone; and a third mode of securing the wheelchair using both the first wheelchair restraint and the second wheelchair restraint.

Example 2 provides the wheelchair securement system of example 1, in which the first wheelchair restraint comprises actuators, and the controller generates control signals that control movement of the actuators according to the selected one of the three selections.

Example 3 provides the wheelchair securement system of example 1, in which the first wheelchair restraint cannot be used alone to secure an occupied wheelchair.

Example 4 provides the wheelchair securement system of example 1, in which the second wheelchair restraint is configured to secure an occupied wheelchair.

Example 5 provides the wheelchair securement system of example 1, in which the first mode comprises placing the first wheelchair restraint in an operative position before the wheelchair enters the vehicle. The operative position comprises positioning the latch at a location where the axle of the wheelchair can be grasped securely.

Example 6 provides the wheelchair securement system of example 1, in which the second mode comprises placing the first wheelchair restraint in an inoperative position before the wheelchair enters the vehicle. The inoperative position comprises positioning the latch away from the wheelchair.

Example 7 provides the wheelchair securement system of example 1, in which the third mode comprises, before the wheelchair enters the vehicle: placing the first wheelchair restraint in an operative position, comprising positioning the latch at a location where the axle of the wheelchair can be grasped securely; and unlocking the second wheelchair restraint such that it is ready to secure the adapter.

Example 8 provides the wheelchair securement system of example 1, further comprising a remote control in communication with the controller, in which operations on the remote control provide instructions to the controller for selecting between the three selections.

Example 9 provides the wheelchair securement system of example 1, further comprising an application software executing in an electronic device, in which the application software provides instructions to the controller for selecting between the three selections.

Example 10 provides the wheelchair securement system of example 1, in which the first wheelchair restraint and the second wheelchair restraint are located at a front-facing rear passenger-side of the vehicle.

Example 11 provides a wheelchair restraint for a vehicle comprising: a bottom chassis securely fastened to a floor of the vehicle; a top chassis configured to slide up and down relative to the bottom chassis; an arm configured to rotate around a pivot axis at a first end proximate to the top chassis; a latch configured to securely grasp an axle of a wheelchair, the latch being attached to a second end of the arm distant from the top chassis and configured to slide relative to the arm toward and away from the top chassis; a first actuator configured to slide the top chassis relative to the bottom chassis; a second actuator configured to rotate the arm around the pivot axis; and a third actuator configured to slide the latch relative to the arm.

Example 12 provides the wheelchair restraint of example 11, in which the latch comprises a horizontal clasp and a vertical clasp and the wheelchair restraint further comprises a fourth actuator configured to move the horizontal clasp and the vertical clasp to securely grasp the axle of the wheelchair.

Example 13 provides the wheelchair restraint of example 11, in which the first actuator, the second actuator, and the third actuator are controlled by a controller according to preset configuration settings of the wheelchair.

Example 14 provides the wheelchair restraint of example 11, in which the top chassis slides relative to the bottom chassis using a sliding mechanism comprising rails.

Example 15 provides the wheelchair restraint of example 11, in which the top chassis slides relative to the bottom chassis using a sliding mechanism comprising slots and pins.

Example 16 provides a controller for a wheelchair securement system, the controller comprising: a memory configured to store preset configuration settings of a wheelchair; and a processor configured to generate a set of instructions for an actuator of a wheelchair restraint in an AV. The wheelchair restraint is configured to secure the wheelchair during motion of the AV.

Example 17 provides the controller of example 16, in which the preset configuration settings are received from an onboard computer in the AV.

Example 18 provides the controller of example 16, in which the set of instructions control the actuator to move the wheelchair restraint from a first operative position to a second operative position according to a selection from among one of three choices: a first mode of securing the wheelchair comprising placing the wheelchair restraint in the first operative position; a second mode of securing the wheelchair comprising placing the wheelchair restraint in the second operative position and unlocking another wheelchair restraint; and a third mode of securing the wheelchair comprising placing the wheelchair restraint in the first operative position and unlocking the another wheelchair restraint.

Example 19 provides the controller of example 16, in which the processor is further configured to generate another set of instructions for a TSB in the AV, the TSB configured to move a transfer seat forward and backward according to the another set of instructions.

Example 20 provides the controller of example 16, in which the controller is configured to communicate with a remote control and an application software executing in an electronic device separate from the controller.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. § 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A wheelchair securement system for a vehicle comprising:
   a first wheelchair restraint comprising a latch configured to grasp an axle of a wheelchair;
   a second wheelchair restraint comprising a mechanism to securely couple with an adapter on the wheelchair; and
   a controller configured to select from among one of three selections:
   a first mode of securing the wheelchair with the first wheelchair restraint alone;
   a second mode of securing the wheelchair with the second wheelchair restraint alone; and
   a third mode of securing the wheelchair with both the first wheelchair restraint and the second wheelchair restraint;
   wherein the latch is provided on an arm;
   wherein the arm is rotatable about an arm axis; and
   wherein the arm is movable transversely in a translation direction perpendicular to the arm axis.

2. The wheelchair securement system of claim 1, wherein the second wheelchair restraint is configured to secure an occupied wheelchair.

3. The wheelchair securement system of claim 1, further comprising a remote control in communication with the controller, wherein operations on the remote control provide instructions to the controller for selecting between the three selections.

4. The wheelchair securement system of claim 1, further comprising an application software executing in an electronic device, wherein the application software provides instructions to the controller for selecting between the three selections.

5. The wheelchair securement system of claim 1, wherein the first wheelchair restraint and the second wheelchair restraint are located at a front-facing rear passenger-side of the vehicle.

6. The wheelchair securement system of claim 1, wherein the first mode of securing the wheelchair is an actuated unoccupied wheelchair restraint and the second mode of securing the wheelchair is an occupied wheelchair restraint.

* * * * *